UNITED STATES PATENT OFFICE.

HENRY CLEMENT SWINNERTON DYER, OF WESTHOPE, ASSIGNOR TO W. G. ARMSTRONG, MITCHELL & CO., LIMITED, OF NEWCASTLE, ENGLAND.

PROCESS OF MANUFACTURING STEEL.

SPECIFICATION forming part of Letters Patent No. 466,927, dated January 12, 1892.

Application filed September 28, 1891. Serial No. 406,998. (No specimens.)

*To all whom it may concern:*

Be it known that I, HENRY CLEMENT SWINNERTON DYER, gentleman, a subject of the Queen of Great Britain, residing at Westhope, county of Salop, England, have invented certain new and useful Improvements in the Process of Manufacturing Steel, of which the following is a specification.

When using an open-hearth furnace when working with the basic process, I commence by increasing the carbonization of the metal in the bath to any required degree. I charge, in the first instance, a suitable quantity of carbonaceous material, such as coal, coke, graphite, charcoal, or other similar substance, but preferably charcoal on account of its freedom from impurities, and then charge scrap or pig iron and scrap on the top of it. As the metal melts it takes up a considerable percentage of carbon, and although in the basic process much of the carbon is eliminated with the phosphorus enough remains to enable the charge to be finished by boiling down with ore in a similar manner to the boiling down of an ordinary charge of pig in a silicious-lined furnace. In this way a steel can be produced having any desired percentage of carbon within certain limits. Hitherto one of the greatest defects of the basic process has been that considerable difficulty and uncertainty is experienced in making steel with more than about fifteen per cent. carbon. Various attempts have been made and patents taken out to overcome this difficulty by running the molten metal through carbon, &c.; but none are reliable.

By my process I first saturate the bath itself with carbon, so that when the phosphorus has been eliminated there will still remain a percentage of carbon in excess of what is required at the finish, and afterward I remove this excess in the ordinary manner by boiling down with ore, so that when the furnace is tapped the metal shall contain exactly the percentage of carbon desired.

It has generally been believed that phosphorus will not leave the metal in the presence of carbon. I find in practice that this idea is erroneous, and that, although a large proportion of carbon is eliminated with the phosphorus, still that when there is an excess of carbon sufficient remains to obtain steel with much higher percentage of carbon than has hitherto been found to be practicable with the basic process.

What I claim is—

The hereinbefore-described process of manufacturing steel, consisting in charging scrap or pig iron and scrap along with carbon in the form of coke or charcoal or other carbonaceous matter into a basic lined open-hearth furnace, then melting the metal in the charge, (the molten charge by taking up carbon will then contain a higher percentage of carbon than is required in the steel to be produced,) and finally boiling down the charge with iron ore until the metal contains the percentage of carbon desired.

HENRY CLEMENT SWINNERTON DYER.

Witnesses:
    ALFRED M. RICHARDS,
        110 *Corve Street, Ludlow,*
    ARTHUR DAVIES,
        41 *Mill Street, Ludlow,*
            *Solicitors' Articled Clerks.*